G. G. W. BURNHAM.
Carriage Wheel.
No. 113,851.                                  Patented April 18, 1871.
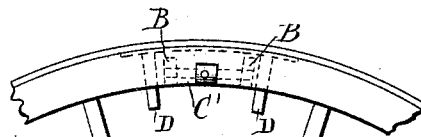
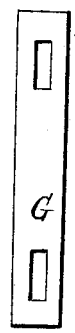
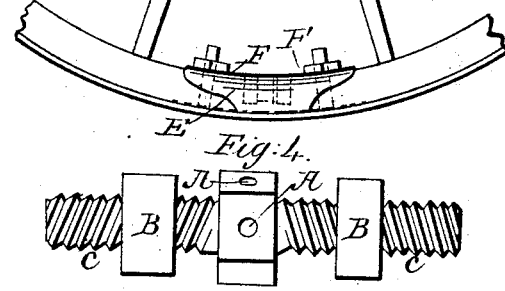
Witnesses.
Inventor
Garrett G. W. Burnham
Daniel Breed Atty

United States Patent Office.

GARRETT G. W. BURNHAM, OF BALTIMORE COUNTY, MARYLAND, ASSIGNOR TO HIMSELF AND JAMES N. BURNHAM.

Letters Patent No. 113,851, dated April 18, 1871.

IMPROVEMENT IN CARRIAGE-WHEELS.

The Schedule referred to in these Letters Patent and making part of the same.

*To all whom it may concern:*

Be it known that I, GARRETT G. W. BURNHAM, of the county of Baltimore and State of Maryland, have invented a new and useful Improvement in Carriage-Wheels; and I do hereby declare that the following is a full and exact description thereof, reference being had to the accompanying drawing and to the letters marked thereon.

In the accompanying drawing—

Figure 1 is a side view of part of a wheel with my improvements attached.

Figure 2 is a detached view of a metallic plate for stiffening the joint of the felly.

Figure 3 is a detached view of the clip used for the same purpose.

Figure 4 is a full-sized view of the right and left-hand screw and nuts for use in a wagon-wheel.

My improvement consists, first, in the arrangement and combination of a right-and-left-hand screw with the fellies of a wheel, tightening a tire without cutting the latter; second, in drawing the ends of the fellies together for putting on the tire, or for relieving the strain upon the wood when the latter is exposed to water after the tire has been set too tight upon dry wood; and in other improvements.

I make a right-and-left-hand screw with a center piece, as seen in fig. 4.

The center piece may be made hexagonal, and provided with holes A for inserting a rod for turning the screw; also, the screw has two nuts, B B.

This right-and-left-hand screw, with its nuts, is inserted at the joint in the fellies, as seen in fig. 1, where C is the screw-bolt, B B the nuts, and A the holes in the center piece.

Two small bolts, D, are inserted through the felly to hold on the clip E, in connection with nuts F, fig. 1.

The clip E is provided with elongated holes e, fig. 3, to allow the bolts D to slide in, tightening the fellies.

When the clip is in place the screw-bolt, fig. 4, is not seen, and it is also completely protected from dirt.

A small plate of metal, G, fig. 2, may be inserted into the tread of the fellies and held in place by the bolts D, so as to stiffen the joint. This plate has also long holes to allow the bolts to slide.

By the above arrangement a two-fellied wheel may be drawn together so as to put on the tire cold, if desired. Then if the wood is very dry there will be room to relieve the strain common to new wheels if immediately exposed to water.

There is no occasion to cut the tire with my improvement, as the tire can be readily tightened by turning the screw.

It is well known to carriage-makers that it is difficult to accurately measure the felly or entire circumference of the wheel, on account of the spaces between the ends of the felly, and then get the tire of the right size.

If the tire is too large it will not, in the common way, bring the fellies to a good joint; and if it is too small it will, in cooling, often spring the spokes, or make the wheel too dishing. But with my improvement all these difficulties are avoided.

I am aware that a right-and-left-hand screw has been used to tighten a broken or cut tire; therefore I limit my claims to an endless or uncut tire, in connection with the above-described means of keeping the tire permanently tight, and securing other advantages, as set forth.

Having described my invention,

I claim—

1. A wheel in which the fellies may be drawn together by means of a right-and-left-hand screw, for the purpose of setting, removing, or easing an uncut tire, substantially as set forth.

2. The stiffening-plate G, for holding the ends of the felly, and thus stiffening the joint, substantially in the manner set forth.

GARRETT G. W. BURNHAM.

Witnesses:
DANIEL BREED,
EDM. F. BROWN.